(12) United States Patent
Wu et al.

(10) Patent No.: US 11,341,009 B1
(45) Date of Patent: May 24, 2022

(54) DIRECTING PLACEMENT OF DATA IN CLOUD STORAGE NODES

(71) Applicant: EMC IP Holding Company LLC, Hopkinton, MA (US)

(72) Inventors: Pengfei Wu, Shanghai (CN); Assaf Natanzon, Tel Aviv (IL); Kun Wang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 264 days.

(21) Appl. No.: 16/252,159

(22) Filed: Jan. 18, 2019

(51) Int. Cl.
*G06F 16/27* (2019.01)
*G06F 11/20* (2006.01)
*G06F 11/14* (2006.01)
*G06F 16/182* (2019.01)
*G06F 16/13* (2019.01)

(52) U.S. Cl.
CPC ...... *G06F 11/2094* (2013.01); *G06F 11/1451* (2013.01); *G06F 11/1464* (2013.01); *G06F 16/137* (2019.01); *G06F 16/1824* (2019.01); *G06F 16/27* (2019.01)

(58) Field of Classification Search
CPC .. G06F 11/2094; G06F 16/27; G06F 11/1464; G06F 16/1824; G06F 16/137; G06F 11/14

USPC .......................................................... 707/653
See application file for complete search history.

(56) References Cited

U.S. PATENT DOCUMENTS 9,235,475 B1 * 1/2016 Shilane ............... G06F 16/1752
2016/0342491 A1 * 11/2016 Kiselev ............... G06F 11/2089

* cited by examiner

*Primary Examiner* — Hosain T Alam
*Assistant Examiner* — Tracy M McGhee
(74) *Attorney, Agent, or Firm* — Dergosits & Noah LLP; Todd A. Noah

(57) ABSTRACT

A system receives a request to store a replica of a data object into any cloud storage node associated with an attribute, and then identifies a redundancy number associated with the data object. The system identifies a number of cloud storage nodes that are associated with the attribute. If the identified number of cloud storage nodes is greater than the redundancy number, the system identifies the redundancy number of cloud storage nodes as a subset of the number of cloud storage nodes, based on the data object and a unique identifier associated with each of the number of cloud storage nodes. The system stores the redundancy number of replicas into the corresponding redundancy number of cloud storage nodes.

20 Claims, 6 Drawing Sheets

DIRECTING PLACEMENT OF DATA IN CLOUD STORAGE NODES

BACKGROUND

If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired point in time when the data object was in this state, and then instructs the backup/restore application to execute a restore operation to restore a copy of the corresponding backup file(s) for that state to the data object.

A data object and/or a backup file may be stored on cloud storage, which is a model of data storage in which digital data is stored in logical pools, with the physical storage spanning multiple servers, and often locations, and the physical environment typically owned and managed by a hosting company. A cloud storage provider is responsible for keeping the stored data available and accessible, and the physical environment protected and running. People and organizations buy or lease storage capacity from a cloud storage provider to store user, organization, and/or application data. Cloud storage services may be accessed through a co-located cloud computer service, a web service application programming interface (API), or by applications that utilize a web service API, such as cloud desktop storage, a cloud storage gateway, or Web-based content management systems.

While this disclosure uses backup files as examples, the procedures discussed apply to general data management operations. In the most general case of storing backup files in cloud storage, a typical backup/restore application reads data on a client system, optionally de-duplicates/compresses the backup data, catalogues the backup data, and sends the backup data to a cloud storage gateway, which exposes a file system interface backed by the cloud storage. Any data written to the file system interface exposed by the cloud storage gateway ends up getting written to the cloud storage. Often the cloud storage gateway is an intelligent device (like Maginatics or SteelStore) and has built-in de-duplication/compression capabilities.

DETAILED DESCRIPTION

The Internet of Things (IoT) is the network of devices, vehicles, and home appliances that contain electronics, software, actuators, and connectivity which allows these things to connect, interact, and exchange data. The Internet of Things involves extending Internet connectivity beyond standard devices, such as desktops, laptops, smartphones, and tablet computers, to any range of traditionally "dumb" or non-Internet-enabled physical devices and everyday objects. Embedded with technology, these devices can communicate and interact over the Internet. and they can be remotely monitored and controlled.

Consequently, significantly large amounts of valuable data are generated, such that people and organizations buy or lease storage capacity from cloud storage providers to securely store replicas, or backup files, of user and organization data. These people and organizations often prefer data mobility to avoid becoming locked in with a single cloud storage provider. Therefore, a decentralized policy-driven back-end data protection system can provide true cloud-agnostic replication and protection policies with easy data mobility from one cloud storage provider to another cloud storage provider. Such an Internet-scale decentralized data protection system is dynamic in nature because data-generating nodes and cloud storage nodes fail relatively often and are constantly joining and leaving the system, which is referred to as high chum. A typical solution to maintain the availability of data is to place multiple replicas, or backup files, of the data in the cloud storage nodes.

Decentralized systems that place data in storage nodes include datacenter-scale systems, such as Infinispan and Ceph, and Internet-scale systems, such as Rollerchain. Although a datacenter-scale system can direct the placement of data in a limited network of storage nodes, a datacenter-scale system cannot be scaled to an Internet-scale system because datacenter-scale systems do not distribute an updated topological map to address the problems of an Internet-scale system's dramatically changing topology. For example, Infinispan would have to broadcast a probabilistic associative array to an entire Internet-scale system to update data placement, which is impractical for Internet-scale systems with high chum because such broadcasting would use significant amounts of network resources and require a relatively significant amount of time. In another example, Ceph does not provide any way to update the entire storage cluster information on each storage node, which is extremely difficult to do in a highly dynamic peer-to-peer system. Every storage node in an Internet-scale system should have a way to actively understand the Internet-scale system so that the fine-grained placement of data could be directed without any centralized server, even in a system with high chum.

Figure 1:
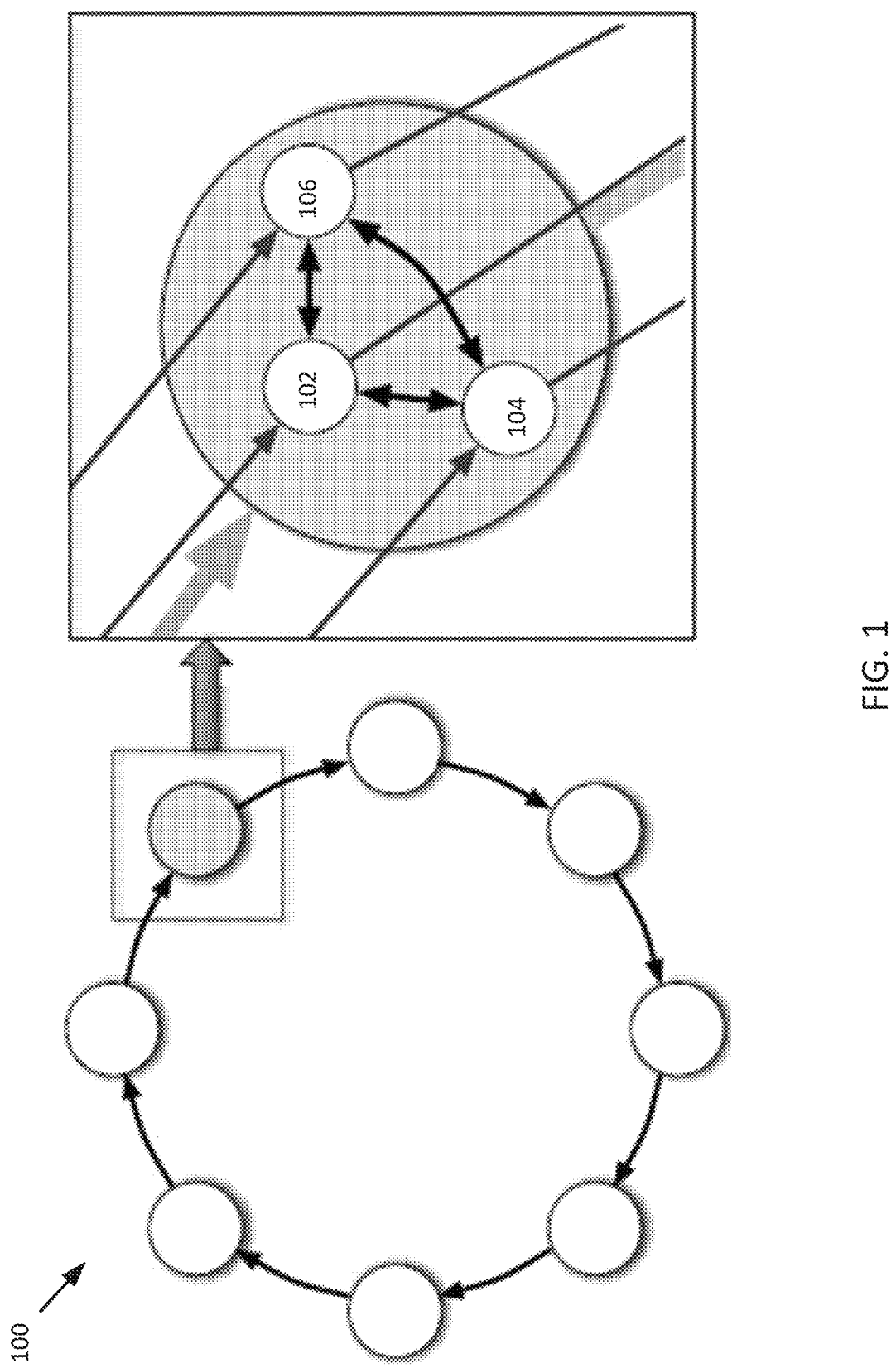
FIG. 1 illustrates a block diagram of an example system for cloud storage nodes.

Rollerchain, an example of an Internet-scale system, implements a distributed hash table that offers efficient data storage through the combination of gossip-based and structured overlay networks. As shown in FIG. 1, each virtual node in a ring 100 of virtual includes its own physical nodes 102-106. The physical nodes 102-106 replicate each other, providing good performance against churn. Though Rollerchain shows good performance against chum, it lacks the flexibility desired to direct the fine-grained placement of data in cloud storage nodes because in a decentralized system, each storage node makes decisions based on its own view of the decentralized system, such that racing conditions can occur. For example, a virtual node that includes three physical storage nodes 102-106 receives a request to delete one replica of three existing replicas stored by the three physical storage nodes 102-106, and each of the physical storage nodes 102-106 decides to delete its own local replica based on the premise that the other two physical storage nodes will retain their replicas, thereby resulting in the deletion of all three replicas from the system. Furthermore, a self-organized peer-to-peer system introduces a significant amount of randomness, making system maintenance and problem resolution difficult because such a system does not have predictable behavior.

Embodiments herein provide directed placement of data in cloud storage nodes. A system receives a request to store a replica of a data object into any cloud storage node associated with an attribute, and then identifies a redundancy number associated with the data object. The system identifies a number of cloud storage nodes that are associated with the attribute. If the identified number of cloud storage nodes is greater than the redundancy number, the system identifies the redundancy number of cloud storage nodes as a subset of the number of cloud storage nodes, based on the data object and a unique identifier associated with each of the number of cloud storage nodes. The system stores the redundancy number of replicas into the corresponding redundancy number of cloud storage nodes.

For example, a replicator in a car receives a request to store a replica of a car's driving route data into an Azure cloud storage node that has a USA eastern data center and a graphics processing unit (GPU), and then identifies a policy that requests the storing of two replicas of the car's driving route data. A finder in the car uses a hash function to create a hash value for the Azure, USA eastern data center, and GPU attributes, searches a distributed hash table for the hash value for these attributes, and identifies three Azure/USA eastern data center/GPU cloud storage nodes. The replicator in the car uses the Inter-Planetary File System protocol to transmit a replica of the car's driving route data to the replicators for these three cloud storage nodes. Since the cloud storage nodes' replicators determine that three, the number of Azure/USA eastern data center/GPU cloud storage nodes, is greater than two, the requested number of replicas, the cloud storage nodes' replicators use a consistent hash function to create a hash value for the replica, and compare the hash value for the replica against the unique identifiers for the three Azure/USA eastern data center/GPU cloud storage nodes to identify two Azure/USA eastern data center/GPU cloud storage nodes. Then the cloud storage nodes' replicators store the two replicas of the car's driving route data into the two identified Azure/USA eastern data center/GPU cloud storage nodes.

Figure 2A:
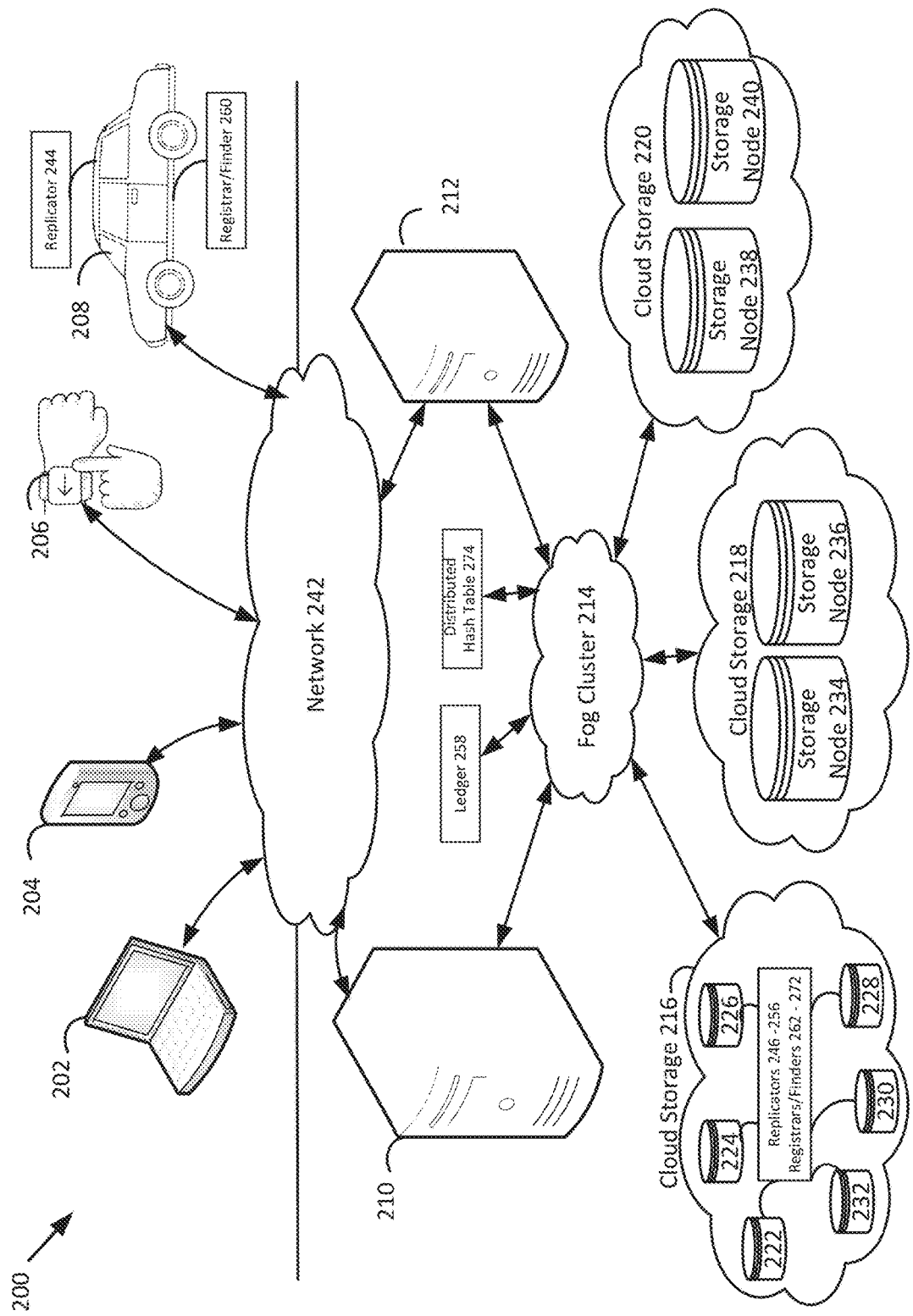
FIGS. 2A-C illustrate block diagrams of example systems for directing placement of data in cloud storage nodes, under an embodiment.
Figure 2B:
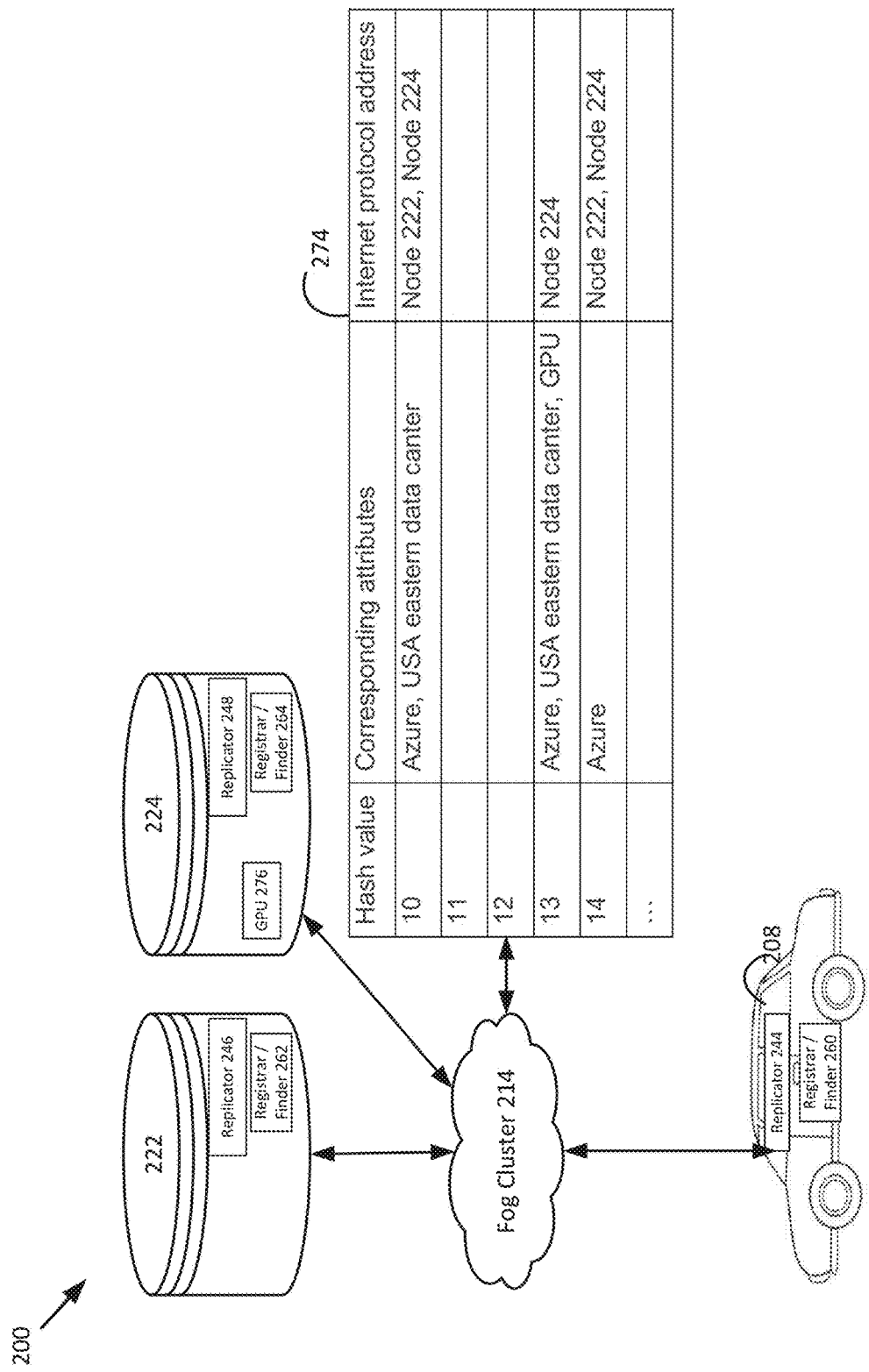
Figure 2C:
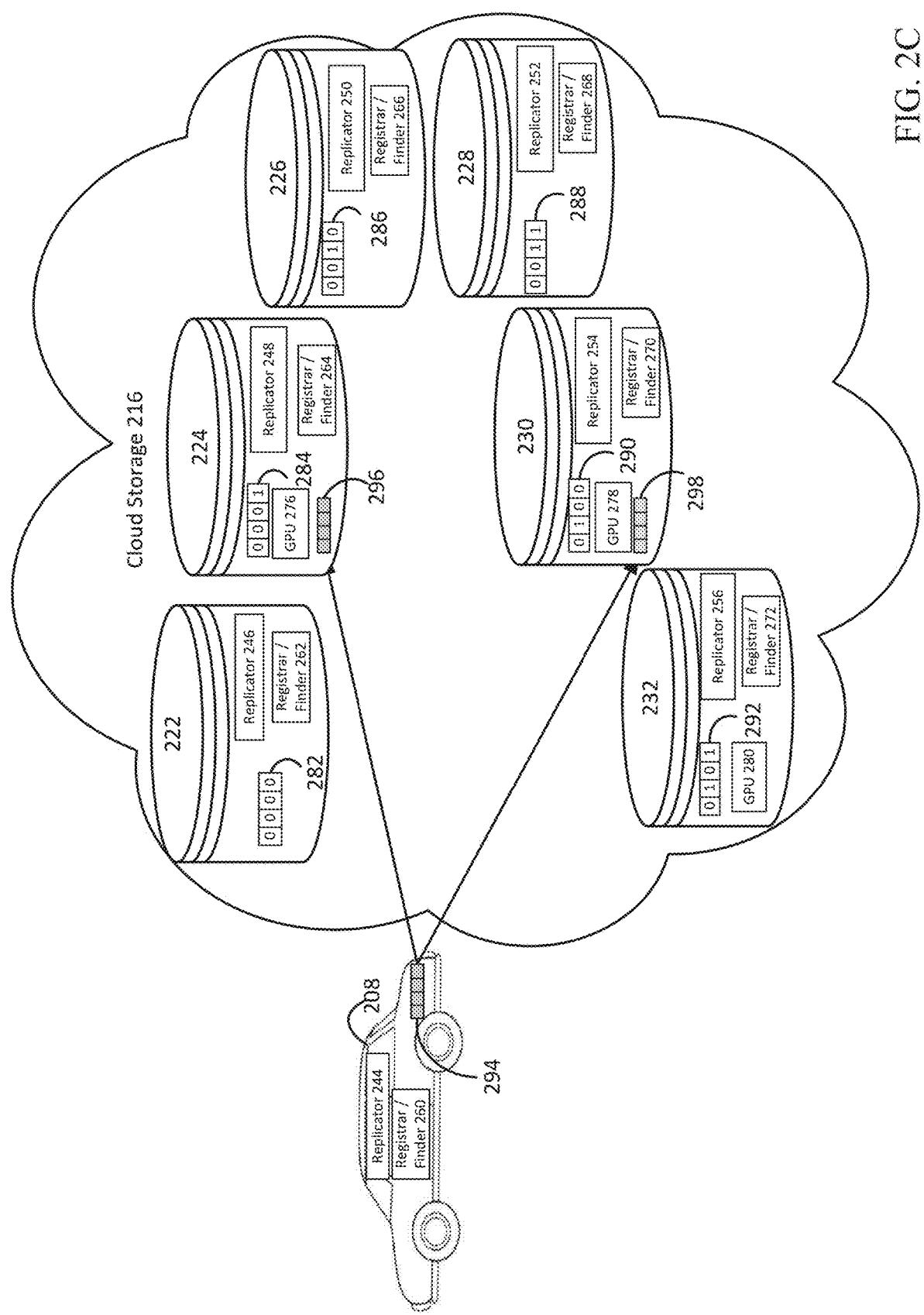

FIGS. 2A-C illustrate a diagram of a system for directed placement of data in cloud storage nodes, under an embodiment. As shown in FIG. 2A, a system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of resources and services for different client users.

In an embodiment, the system 200 represents a cloud computing system that includes a first client 202, a second client 204, a third client 206, and a fourth client 208; and a first server 210, a second server 212, a fog cluster 214, a first cloud storage 216, a second cloud storage 218, and a third cloud storage 220, that may be provided by a hosting company. Although FIG. 2A depicts the first client 202 as a laptop computer 202, the second client 204 as a smart phone 204, the third client 206 as a smart watch 206, and the fourth client 208 as a connected car 208, each of the clients 202-208 may be any type of computer, such as a server. The connected car 208 is a vehicle that is equipped with Internet access, and possibly also with a wireless local area network that allows the vehicle to share Internet access and data with other devices both inside as well as outside the vehicle. The fog cluster 214 is an architecture that uses edge devices, such as routers, routing switches, integrated access devices, multiplexers, and a variety of metropolitan area network and wide area network access devices, to carry out a substantial amount of computation, storage, communication locally and routed over the Internet. The fog cluster 214 may be equated to a regional data center or a regional cloud storage, in contrast to a global data center or a global cloud storage.

The first cloud storage 216 includes a first storage node 222 through a sixth storage node 232, the second cloud storage 218 includes a seventh storage node 234 and an eighth storage node 236, and the third cloud storage 220 includes a ninth storage node 238 and a tenth storage node 240. The clients 202-208 and the servers 210-212 communicate via a network 242. Although FIG. 2A depicts the system 200 with four clients 202-208, two servers 210-212, one fog cluster 214, three cloud storages 216-220, ten storage nodes 222-240, and one network 242, the system 200 may include any number of clients 202-208, any number of servers 210-212, any number of fog clusters 214, any number of cloud storages 216-220, any number of storage devices 222-240, and any number of networks 242. The clients 202-208 and the servers 210-212 may each be substantially similar to the system 400 depicted in FIG. 4 and described below.

The first server 210 and the second server 212 may be referred to as the first cloud storage gateway 210 and the second cloud storage gateway 212, each of which may be a network appliance or server which resides at a customer's premises, and which can translate cloud storage application programming interfaces to block-based storage protocols. Examples of cloud storage application programming interfaces include Simple Object Access Protocol (SOAP) and Representational State Transfer (REST). Examples of block-based storage protocols include Internet Small Computer System Interface (iSCSI), Fibre Channel, and file-based interfaces such as Network File System (NFS) and Server Message Block (SMB), one version of which is also known as Common Internet File System (CIFS). A file system interface may be an API (Application Programming Interface) through which a utility or user program requests the storing and retrieving of data. The first cloud storage gateway 210 and the second cloud storage gateway 212 can each serve as an intermediary to multiple cloud storage providers. The first cloud storage 216 may be a Microsoft® Azure cloud platform, the second cloud storage 218 may be an Amazon Web Services® cloud platform, and the third cloud storage 220 may be a Google® cloud platform.

The connected car 208 includes a replicator 244, which may be referred to as the replication engine 244, that can generate a replication plan to create replicas of the data and the metadata of the connected car 208, and also transmit the replicas to any of the other clients 202-206 and the storage nodes 222-240. The replicator 244 can also generate a restoration plan to execute a restoration based on the replicas. Although FIG. 2A depicts the replicator 244 residing on the connected car 208, each of the clients 202-208 may include its own dedicated replicator. Similarly, although FIG. 2A depicts the replicators 246-256 residing on the storage nodes 222-232, each of the storage nodes 234-240 may include its own dedicated replicator.

The replicators 244-256 can generate a replication plan, replicate a data object in accordance with the replication plan, record each of the replication steps in a ledger 258, and sign the entries in the ledger 258 such that each replication step is acknowledged. The ledger 258 may be a distributed ledger and/or a blockchain ledger. A blockchain is a growing list of records, called blocks, which are linked using cryptography, and may be implemented using any common blockchain technology, such as Hyperledger, Ethereum, and MultiChain. When used as a distributed ledger, a blockchain is typically managed by a peer-to-peer network collectively adhering to a protocol for inter-node communication and validating new blocks. Once recorded, the data in any given block cannot be altered retroactively without alteration of all subsequent blocks, which requires consensus of the network majority.

The ledger 258 stores information about transactions that have occurred and transactions that are instructed to occur. For example, the replicator 244 publishes a protection policy to the ledger 258, specifying how a data object stored by the connected car 208 is to be protected. The replicators 244-256 can access the ledger 258 to confirm that the replication of data objects have been successfully instructed and performed, and can also verify that the data objects are protected and replicated in accordance with the relevant policies.

The connected car 208 also includes a registrar/finder 260 that can register the connected car 208 and its attributes, and/or use storage node attributes to find storage nodes with those attributes. Although FIG. 2A depicts the registrar/finder 260 residing on the connected car 208, each of the clients 202-208 may include its own dedicated registrar/finder. Similarly, although FIG. 2A depicts the registrar/finders 262-272 residing on the storage nodes 222-232, each of the storage nodes 234-240 may include its own dedicated registrar/finder. Although examples describe each of the registrar/finders 262-272 as single components that can provide both registration features and finding features, each of the registrar/finders 262-272 may be two components, a registrar component that can provide registration features and a finder component that can provide finding features.

The system 200 includes a distributed hash table 274, which is a class of a decentralized distributed system that provides a lookup service similar to a hash table. The distributed hash table 274 stores (key, value) pairs so that any participating node can efficiently retrieve the value associated with a given key. Responsibility for maintaining the mapping from keys to values is distributed among the nodes, in such a way that a change in the set of participants causes a minimal amount of disruption. This enables the distributed hash table 274 to scale to extremely large numbers of nodes and to handle continual node arrivals, departures, and failures. A traditional system can use a distributed hash table to find data if the traditional system knows the hash function that was applied to the data. Instead of using the distributed hash table 274 to find data, the system 200 uses the distributed hash table 274 to find cloud storage nodes with specific attributes.

The registrar/finders 260-272 can register their storage nodes 208 and 222-232 and their attributes by hashing combinations of these attributes and then storing the resulting hash values in the distributed hash table 274. For example, the registrar/finder 260 for the cloud storage node 222 determines that the cloud storage node 222 is an Azure cloud storage node for the USA eastern data center. Then the registrar/finder 260 creates basic metadata that reflects a basic description of the cloud storage node 222 as an Azure cloud storage node, applies a cryptographic hash function to the basic metadata to produce a hash value of 14, and then stores the Internet protocol address for the cloud storage node 222 with the corresponding hash value of 14 in the distributed hash table 274, as depicted by FIG. 2B. The registrar/finder 260 uses the basic metadata attribute for an Azure cloud storage node to generate a hash value of 14 for the cloud storage node 222 because a data storage request may request to store data on any Azure cloud storage node. Next, the registrar/finder 260 creates complex metadata that reflects a complex description of the cloud storage node 222 as an Azure cloud storage node for the USA eastern data center, applies a cryptographic hash function to the complex metadata to produce a hash value of 10, and then stores the Internet protocol address for the cloud storage node 222 with the corresponding hash value of 10 in the distributed hash table 274, as depicted by FIG. 2B. The registrar/finder 260 uses the complex metadata attributes for an Azure cloud storage node for the USA eastern data center to generate a hash value of 10 for the cloud storage node 222 because a data storage request may request to store data on an Azure cloud storage node for the USA eastern data center. While registrars use basic-to-comprehensive amounts of attributes to describe their cloud storage nodes, the registrars only use stable attributes to describe their cloud storage nodes, because if a cloud storage node was registered based on a transitory attribute, the cloud storage node may no longer have the transitory attribute when the transitory attribute is subsequently used to find and then access the cloud storage node.

Similarly, the registrar/finder 262 for the cloud storage node 224 determines that the cloud storage node 224 is an Azure cloud storage node for the USA eastern data center with a GPU 276. Then the registrar/finder 262 creates basic metadata that reflects a basic description of the cloud storage node 224 as an Azure cloud storage node, applies a cryptographic hash function to the basic metadata to produce a hash value of 14, and stores the Internet protocol address for the cloud storage node 224 with the corresponding hash value of 14 in the distributed hash table 274, as depicted by FIG. 2B. The registrar/finder 262 applies the same cryptographic hash function to attributes that the registrar/finder 260 applies to attributes so that hash values of the same attribute(s) will produce the same hash values, such that a hash value stored in the distributed hash table 274 will correspond to all of the Internet protocol addresses for all of the storage nodes that correspond to the attribute(s). Next, the registrar/finder 262 creates complex metadata that reflects a complex description of the cloud storage node 224 as an Azure cloud storage node for the USA eastern data center, applies a cryptographic hash function to the complex metadata to produce a hash value of 10, and stores the Internet protocol address for the cloud storage node 224 with the corresponding hash value of 10 in the distributed hash table 274, as depicted by FIG. 2B. When applying the cryptographic hash function to a combination of attributes, registrars use the same predefined protocol, or order of attributes, for each registration so that each set of cloud storage nodes that correspond to the same combination of attributes will also correspond to the same hash value.

Finally, the registrar/finder 262 creates detailed metadata that reflects a detailed description of the cloud storage node 224 as an Azure cloud storage node for the USA eastern data center with a GPU 276, applies a cryptographic hash function to the complex metadata to produce a hash value of 13, and then stores the Internet protocol address for the cloud storage node 224 with the corresponding hash value of 13 in the distributed hash table 274, as depicted by FIG. 2B. The distributed hash table 274 depicted by FIG. 2B is simplified for the purposes of illustrative examples, as the distributed hash table 274 may correspond to significantly more attributes, have significantly more entries for hash values, and have significantly more entries for Internet Protocol addresses. Likewise, the hash values may have significantly more digits. Similar to the process for using cloud storage node attributes to register cloud storage nodes in the distributed hash table 274, the registrar/finders 260-272 can use cloud storage node attributes to find cloud storage nodes with those attributes by searching the distributed hash table 274.

In a decentralized network, cloud storage nodes may join and leave the network constantly. Since removing an entry from the distributed hash table 274 may very difficult, if a cloud storage node leaves the network under normal conditions, the cloud storage node's registrar/finder may replace the cloud storage node's Internet protocol address with a recognized placeholder, such as a null value. The decentralized network can account for cloud storage nodes that fail unexpectedly, and therefore fail to replace the cloud storage node's Internet protocol address with a recognized placeholder, by providing a timestamp record for each cloud storage node registration and requiring each cloud storage node to reregister within a specified time period, such that an entry with an expired timestamp can be identified as a failed cloud storage node.

The system receives a request to store a replica of a data object into a requested type of cloud storage node. For example, the replicator 244 in the connected car 208 receives a request to store a replica of a car's driving route data into an Azure cloud storage node that has a USA eastern data center and a graphics processing unit (GPU), as depicted by FIG. 2B. A request can be an instruction to a computer, such as an instruction to store a data object. A replica can be the information needed to restore a data object to a state at a specific time when the information was recorded. A data object can be a collection or a group of information that is backed up as a unit, such as the information for a computer or a network of computers. Cloud storage nodes can be a network of remote pieces of equipment that retains retrievable data. An attribute can be a quality or feature regarded as a characteristic of something.

After receiving a request to store a replica of a data object, the system identifies a requested number of replicas for the data object. For example, the replicator 244 in the connected car 208 identifies a policy that requests the storing of two replicas of the car's driving route data). A redundancy number can be an arithmetical value that represents a protected level of failure.

Following receipt of a request to store a replica to a requested type of cloud storage node, the system identifies the number of this type of cloud storage nodes. For example, the registrar/finder 260 in the connected car 208 uses a hash function to create a hash value of 13 for the Azure, USA eastern data center, and GPU attributes, searches the distributed hash table 274 for the hash value of 13 for these attributes as depicted by FIG. 2B. A number can be an arithmetical value. A hash value can be data of a fixed size to which a function maps data of arbitrary size.

FIG. 2C depicts the registrar/finders 270-272, which create detailed metadata that reflects a detailed description of the cloud storage nodes 230-232 as Azure cloud storage nodes for the USA eastern data center with GPUs 278-280, that apply a cryptographic hash function to the complex metadata to produce a hash value of 13, and then store the Internet protocol address for the cloud storage nodes 230-232 with the corresponding hash value of 13 in the distributed hash table 274, which is not depicted by FIG. 2B.

Continuing the example, the registrar/finder 260 in the connected car 208 identifies three Azure/USA eastern data center/GPU cloud storage nodes 224, 230, and 232, as depicted by FIG. 2C. FIG. 2C also depicts that each of the cloud storage nodes 222-232 has its own corresponding unique identifier 282-292, which in this simplified example are the binary numbers 0000, 0001, 0010, 0011, 0100, and 0101, respectively. Although FIG. 2C depicts the values of 0 to 5 for the unique identifier 282-292, the values for the unique identifier 282-292 may be significantly larger. A unique identifier can be a sequence of characters that is the only one of its kind that is used to refer to a system element.

After identifying the three cloud storage nodes 224, 230, and 232, the replicator in the connected car 208 uses the Inter-Planetary File System protocol to transmit a replica 294 of the car's driving route data to the replicators 248, 254, and 256 for these three cloud storage nodes 224, 230, and 232, as depicted by FIG. 2C.

If the identified number of cloud storage nodes is greater than the requested number of replicas, the system identifies a subset of the identified cloud storage nodes, based on the data object and the identified cloud storage nodes' unique identifiers. For example, since the cloud storage nodes' replicators 248, 254, and 256 determine that three, the number of Azure/USA eastern data center/GPU cloud storage nodes 224, 230, and 232, is greater than two, the requested number of replicas, the cloud storage nodes' replicators 248, 254, and 256 use a consistent hash function to create a hash value of 2 (binary 0010) for the replica 294 of the car's driving route data. A subset can be a part of a larger group of related things. A consistent hash function can be a process that can regularly map data of arbitrary size to data of a fixed size over time.

Then the cloud storage nodes' replicators 248, 254, and 256 use the exclusive or (XOR) function to compare the hash value of 0010 for the replica 294 against the unique identifiers 1 (binary 0001) 284, 4 (binary 0100) 290, and 5 (binary 0101) 292 for the three Azure/USA eastern data center/GPU cloud storage nodes 224, 230, and 232, respectively. The exclusive or function applied to the hash value of binary 0010 for the replica 294 against the unique identifier 1 (binary 0001) 284 for the Azure/USA eastern data center/GPU cloud storage node 224 produces a binary value of 0011, which is a distance of 3 between the hash value binary 0010 and the unique identifier binary 0001 284. The exclusive or function applied to the hash value of binary 0010 for the replica 294 against the unique identifier 4 (binary 0100) 290 for the Azure/USA eastern data center/GPU cloud storage node 230 produces a binary value of 0110, which is a distance of 6 between the hash value binary 0010 and the unique identifier binary 0100 290. The exclusive or function applied to the hash value of binary 0010 for the replica 294 against the unique identifier 5 (binary 0101) 292 for the Azure/USA eastern data center/GPU cloud storage node 232 produces a binary value of 0111, which is a distance of 7 between the hash value binary 0010 and the unique identifier binary 0101 292.

Based on the hash value and the cloud storage nodes' unique identifiers, the cloud storage nodes' replicators 248, 254, and 256 identify the two Azure/USA eastern data center/GPU cloud storage nodes 224 (corresponding distance of 3) and 230 (corresponding distance of 6) with the shortest distances from the hash value of 2 for storing the two copies of the replica 294 of the car's driving route data. The cloud storage nodes' replicators 248, 254, and 256 would not identify the Azure/USA eastern data center/GPU cloud storage node 232 (corresponding distance of 7) for storing any copies of the replica 294 of the car's driving route data because the distance of 7 is not among the two shortest calculated distances from the hash value of 2.

The data placement process would not necessarily result in the same cloud storage nodes being identified for storing different replicas because the identification of the subset of cloud storage nodes is based on the hash value of each replica, which differs between different replicas. For a different example, if the hash value was 1 (binary 0001), then the exclusive or distances between the hash value of 1 (binary 0001) and the unique identifiers 1 (binary 0001) 284, 4 (binary 0100) 290, and 5 (binary 0101) 292 for the three Azure/USA eastern data center/GPU cloud storage nodes 224, 230, and 232, respectively, would be the distances of 0, 5, and 4, respectively. In this different example, the cloud storage nodes' replicators 248, 254, and 256 would identify the two Azure/USA eastern data center/GPU cloud storage nodes 224 (corresponding distance of 0) and 232 (corresponding distance of 4) for storing the two copies of the different replica. In this different example, the cloud storage nodes' replicators 248, 254, and 256 would not identify the Azure/USA eastern data center/GPU cloud storage node 230 (corresponding distance of 5) for storing the any copies of the different replica because the distance of 5 is not among the two shortest calculated distances from the hash value of 1. Although these examples describe the hash values of binary 0001 and binary 0010 for the replica 294, the hash values for replicas may be significantly larger. While these examples describe the use of the exclusive or function to compare the distance between hash values binary 0001 and binary 0010 for the replica 294 and the unique identifiers 1 (binary 0001) 284, 4 (binary 0100) 290, and 5 (binary 0101) 292, any suitable function can be used to compare the distance between hash values for replicas and unique identifiers for cloud storage nodes.

Following the identification of the subset of cloud storage nodes for storing the replicas, the system stores the requested number of replicas into the identified subset of cloud storage nodes. For example, the cloud storage nodes' replicators 248 and 254 store the two replicas 296-298 of the car's driving route data into the two identified Azure/USA eastern data center/GPU cloud storage nodes 224 and 230.

Even if multiple cloud storage nodes wake up at the same time, they use the same consistent hash function to decide which cloud storage nodes will store the replicas, such that all of these self-organized cloud storage nodes will make the same decision as to which cloud storage nodes will store the replicas. Since the consistent hash placement process provides a predictable behavior about which cloud storage nodes store replicas, data availability is improved, and the racing conditions are solved efficiently. Due to the deterministic feature of this data placement, the system is easy to maintain. If an error occurs, the system's predicted behavior can easily be compared with the system's actual behavior to determine what went wrong.

If an insufficient number of the requested type of cloud storage nodes are available to store the requested number of replicas, policies can specify whether or not the system should create the requested number of replicas. For example, the system 200 could store replicas on other types of cloud storage nodes, store more than one replica on a single cloud storage node, or simply accept the current state with fewer replicas. For example, if the cloud storage node 224 had failed, such that the cloud storage nodes 230-232 were the only two available cloud storage nodes with the Azure/USA eastern data center/GPU attributes, then the cloud storage nodes' replicators 254 and 256 would store the two replicas 296-298 of the car's driving route data into the only two available Azure/USA eastern data center/GPU cloud storage nodes 230 and 232, which is not depicted in FIG. 2C.

Once the subset of cloud storage nodes 224 and 230 stores the replicas 296-298, the subset of cloud storage nodes 224 and 230 caches the replica storage information, and/or stores the replica storage information in the distributed hash table 274. The replica storage information that is stored in the distributed hash table 274 is updated whenever any replica in the system 200 is added, removed or migrated, whereas the replica storage information that is cached in the subset cloud storage node 224 may become out of date when the subset cloud storage node 224 is unavailable.

If one of the cloud storage nodes that stores a replica becomes unavailable, the system can retrieve a replica from an available cloud storage node, and then store the replica into an available cloud storage node that did not store the replica. For example, if the replicator 248 on the cloud storage node 224 uses the replica storage information cached on the cloud storage node 224 to monitor the cloud storage node 230, and determines that the cloud storage node 230 that stores the copy 298 of the replica 294 has failed, then the cloud storage node replicator 248 retrieves the copy of the replica 296 from the cloud storage node 224. Next, the registrar/finder 264 uses the distributed hash table 274 to identify the cloud storage node 232 as having the same attributes as the failed cloud storage node 230 and the closest remaining exclusive or distance to the hash value of the replica 294. Then the cloud storage node replicator 248 transmits the copy of the replica 296 to the cloud storage node replicator 248, which stores the copy to the cloud storage node 232, thereby maintaining the required level of protection against failed storage nodes. Available cloud storage nodes can be a network of remote pieces of equipment that retains retrievable data and that is able to be used. Unavailable can be not able to be used.

Alternatively, or additionally, the replicator 244 in the connected car 208 uses the replica storage information stored in the distributed hash table 274 to monitor the cloud storage node 230, and determine that the cloud storage node 230 that stores the copy 298 of the replica 294 has failed, such that the replicator 244 in the connected car 208 retrieves the copy of the replica 296 from the cloud storage node 224. Next, the registrar/finder 260 uses the distributed hash table 274 to identify the cloud storage node 232 as having the same attributes as the failed cloud storage node 230 and the closest remaining exclusive or distance to the hash value of the replica 294. Then the replicator 244 in the connected car 208 transmits the copy of the replica 296 to the cloud storage node replicator 248, which stores the copy to the cloud storage node 232, thereby maintaining the required level of protection against failed storage nodes.

Upon receiving a request to retrieve a replica of a data object from a specific type of cloud storage node, the system identifies the number of the specific type of cloud storage nodes. For example, if the replicator 244 in the connected car 208 requests to retrieve the replica 294 of the car's driving route data from an Azure cloud storage node that has a USA eastern data center and a graphics processing unit (GPU), the registrar/finder 260 in the connected car 208 uses a hash function to create a hash value of 13 for the Azure, USA eastern data center, and GPU attributes, searches the distributed hash table 274 for the hash value of 13 for these attributes, and identifies three Azure/USA eastern data center/GPU cloud storage nodes 224, 230, and 232. Then the replicator 244 in the connected car 208 uses the InterPlanetary File System protocol to transmit the request for the replica 294 of the car's driving route data to the replicators 248, 254, and 256 for these three cloud storage nodes 224, 230, and 232.

After identifying the specific type of cloud storage nodes, the system identifies a subset of the specific type of cloud storage nodes, based on the data object and the cloud storage nodes' unique identifiers. For example, the cloud storage nodes' replicators 248, 254, and 256 use the exclusive or function to compare the hash value of binary 0010 for the replica 294 against the unique identifiers binary 0001 284, binary 0100 290, and binary 0101 292 for the three Azure/USA eastern data center/GPU cloud storage nodes 224, 230, and 232 to identify the two Azure/USA eastern data center/GPU cloud storage nodes 224 and 230 as storing the replicas 296-298.

Following the identification of the subset of the identified cloud storage nodes, the system retrieves a replica from any of the subset of cloud storage nodes. For example, the cloud storage node replicator 248 retrieves the replica 296 of the car's driving route data from the identified Azure/USA eastern data center/GPU cloud storage node 224, and then uses the Inter-Planetary File System protocol to transmit the replica 296 of the car's driving route data to the replicator 244 in the connected car 208.

Figure 3:
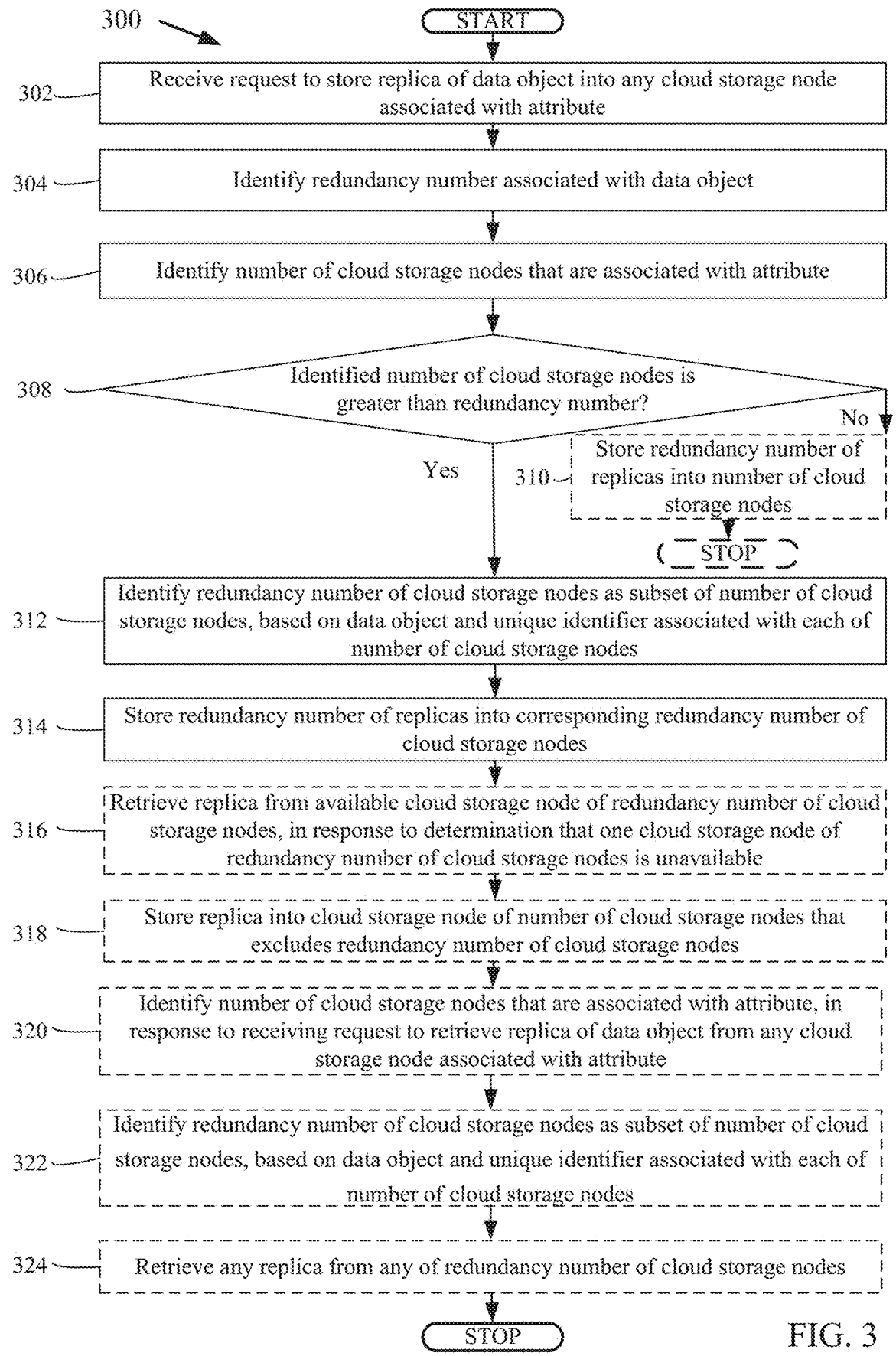
FIG. 3 is a flowchart that illustrates a method for directing placement of data in cloud storage nodes, under an embodiment.

FIG. 3 is a flowchart that illustrates a method for directed placement of data in cloud storage nodes, under an embodiment. Flowchart 300 illustrates method acts illustrated as flowchart blocks for certain steps involved in and/or between the clients 202-208 and/or the servers 210-212 of FIG. 2A.

A request is received to store a replica of a data object into any cloud storage node associated with an attribute, block 302. The system receives requests to store replicas in a type of a cloud storage node. For example, and without limitation, this can include the replicator 244 in the connected car 208 receiving a request to store the replica 294 of a car's driving route data into an Azure cloud storage node that has a USA eastern data center and a graphics processing unit (GPU), After receiving a request to store a replica of a data object, a redundancy number is identified that is associated with the data object, block 304. The system identifies the protection level for a replica. By way of example and without limitation, this can include the replicator 244 identifying a policy that requests the storing of two replicas of the car's driving route data.

Following a request to store a replica into any cloud storage node associated with an attribute, a number of cloud storage nodes are identified that are associated with the attribute, block 306. The system identifies cloud storage nodes that have the requested attribute(s). In embodiments, this can include the registrar/finder 260 in the connected car 208 using a hash function to create a hash value of 13 for the Azure, USA eastern data center, and GPU attributes, searching the distributed hash table 274 for the hash value of 13 for these attributes, and identifying three Azure/USA eastern data center/GPU cloud storage nodes 224, 230, and 232. Then the replicator 244 in the connected car 208 uses the Inter-Planetary File System protocol to transmit the replica 294 of the car's driving route data to the replicators 248, 254, and 256 for these three cloud storage nodes 224, 230, and 232.

Having identified a number of cloud storage nodes and a redundancy number, a determination is made whether the identified number of cloud storage nodes is greater than the redundancy number, block 308. The system determines if there are enough available cloud storage nodes for the specified protection level. For example, and without limitation, this can include the cloud storage nodes' replicators 248, 254, and 256 determining whether three, the number of Azure/USA eastern data center/GPU cloud storage nodes 224, 230, and 232, is greater than two, the requested number of replicas. If the identified number of cloud storage nodes is not greater than the redundancy number, then the method 300 continues to block 310 to store replicas in a limited number of cloud storage nodes. If the identified number of cloud storage nodes is greater than the redundancy number, then the method 300 proceeds to block 312 to identify a subset of the identified cloud storage nodes for storing replicas.

If the identified number of cloud storage nodes is not greater than the redundancy number, the redundancy number of replicas are stored into the number of cloud storage nodes, block 310. The system can store replicas in a limited number of cloud storage nodes. By way of example and without limitation, if the cloud storage node 224 had failed, such that the cloud storage nodes 230 and 232 were the only two available cloud storage nodes with the Azure/USA eastern data center/GPU attributes, then this can include the cloud storage nodes' replicators 254 and 256 storing the two replicas 296-298 of the car's driving route data into the only two available Azure/USA eastern data center/GPU cloud storage nodes 230 and 232.

If the identified number of cloud storage nodes is greater than the redundancy number, the redundancy number of cloud storage nodes is identified as a subset of the number of cloud storage nodes, based on the data object and a unique identifier associated with each of the number of cloud storage nodes, block 312. The system identifies specific cloud storage nodes for storing replicas. In embodiments, this can include the cloud storage nodes' replicators 248, 254, and 256 determining that three, the number of Azure/USA eastern data center/GPU cloud storage nodes 224, 230, and 232, is greater than two, the requested number of replicas, and then using a consistent hash function to create a hash value of binary 0010 for the replica 294. Then the cloud storage nodes' replicators 248, 254, and 256 use the exclusive or function to compare the hash value of binary 0010 for the replica 294 against the unique identifiers binary 0001 284, binary 0100 290, and binary 0101 292 for the three Azure/USA eastern data center/GPU cloud storage nodes 224, 230, and 232 to identify the subset of two Azure/USA eastern data center/GPU cloud storage nodes 224 and 230 for storing the replicas.

After identifying the redundancy number of cloud storage nodes, the redundancy number of replicas are stored into the corresponding redundancy number of cloud storage nodes, block 314. The system stores replicas in specific cloud storage nodes. For example, and without limitation, this can include the cloud storage nodes' replicators 248 and 254 storing the two replicas 296-298 of the car's driving route data into the two identified Azure/USA eastern data center/GPU cloud storage nodes 224 and 230.

Following the storing of replicas, a replica is optionally retrieved from an available cloud storage node of the redundancy number of cloud storage nodes, in response to a determination that one cloud storage node of the redundancy number of cloud storage nodes is unavailable, block 316. The system can retrieve an available replica when its corresponding replica becomes unavailable. By way of example and without limitation, if the replicator 248 on the cloud storage node 224 uses the replica storage information cached on the cloud storage node 224 to monitor the cloud storage node 230, and determines that the cloud storage node 230 that stores the copy 298 of the replica 294 has failed, then the cloud storage node replicator 248 retrieves the copy of the replica 296 from the cloud storage node 224.

Having retrieved a replica from an available storage node, the replica is optionally stored into a cloud storage node of the number of cloud storage nodes that excludes the redundancy number of cloud storage nodes, block 318. The system can store replicas in other cloud storage nodes to reestablish the requested protection level. In embodiments, this can include the registrar/finder 264 using the distributed hash table 274 to identify the cloud storage node 232 as having the same attributes as the failed cloud storage node 230 and the closest remaining exclusive or distance to the hash value of the replica 294. Then the cloud storage node replicator 248 transmits the copy of the replica 296 to the cloud storage node replicator 248, which stores the copy to the cloud storage node 232, thereby maintaining the required level of protection against failed storage nodes.

After storing replicas in specific cloud storage nodes, a number of cloud storage nodes are optionally identified that are associated with a specific attribute, in response to receiving a request to retrieve a replica of a data object from any cloud storage node associated with the specific attribute, block 320. The system can receive requests to retrieve replicas. For example, and without limitation, if the replicator 244 in the connected car 208 requests to retrieve the replica 294 of a car's driving route data from an Azure cloud storage node that has a USA eastern data center and a graphics processing unit (GPU), this can include the registrar/finder 260 in the connected car 208 using a hash function to create a hash value of 13 for the Azure, USA eastern data center, and GPU attributes, searching the distributed hash table 274 for the hash value of 13 for these attributes, and identifying three Azure/USA eastern data center/GPU cloud storage nodes 224, 230, and 232. Then the replicator 244 in the connected car 208 uses the Inter-Planetary File System protocol to transmit the request for the replica 294 of the car's driving route data to the replicators 248, 254, and 256 for these three cloud storage nodes 224, 230, and 232.

Following a request to retrieve a replica from any of a number of cloud storage nodes associated with the specific attribute, the redundancy number of cloud storage nodes are optionally identified as a subset of the number of cloud storage nodes, based on the data object and a unique identifier associated with each of the number of cloud storage nodes, block 322. The system can identify the specific cloud storage nodes that store the requested replica. By way of example and without limitation, this can include the cloud storage nodes' replicators 248, 254, and 256 using the exclusive or function to compare the hash value of binary 0010 for the replica 294 against the unique identifiers binary 0001 284, binary 0100 290, and binary 0101 292 for the three Azure/USA eastern data center/GPU cloud storage nodes 224, 230, and 232 to identify two Azure/USA eastern data center/GPU cloud storage nodes 224 and 230.

Having identified the redundancy number of cloud storage nodes, a replica is optionally retrieved from any of the redundancy number of cloud storage nodes, block 324. The system can retrieve the requested replica from the identified cloud storage nodes. In embodiments, this can include the cloud storage node replicator 248 retrieving the replica 296 of the car's driving route data from the identified Azure/USA eastern data center/GPU cloud storage node 224, and using the Inter-Planetary File System protocol to transmit the replica 296 of the car's driving route data to the replicator 244 in the connected car 208.

Although FIG. 3 depicts the blocks 302-324 occurring in a specific order, the blocks 302-324 may occur in another order. In other implementations, each of the blocks 302-324 may also be executed in combination with other blocks and/or some blocks may be divided into a different set of blocks.

Figure 4:
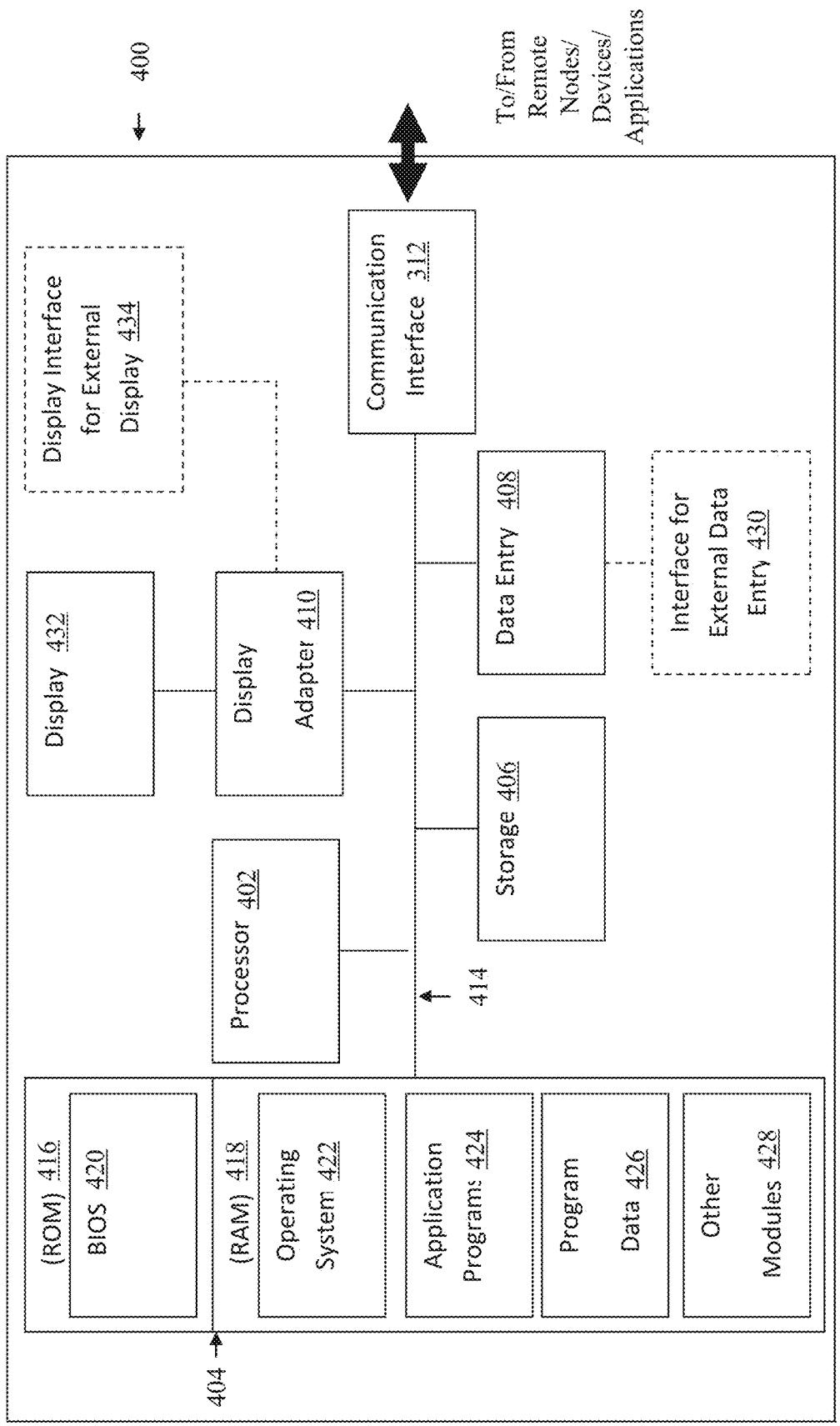
FIG. 4 is a block diagram illustrating an example hardware device in which the subject matter may be implemented.

Having described the subject matter in detail, an exemplary hardware device in which the subject matter may be implemented shall be described. Those of ordinary skill in the art will appreciate that the elements illustrated in FIG. 4 may vary depending on the system implementation. With reference to FIG. 4, an exemplary system for implementing the subject matter disclosed herein includes a hardware device 400, including a processing unit 402, memory 404, storage 406, a data entry module 408, a display adapter 410, a communication interface 412, and a bus 414 that couples the elements 404-412 to the processing unit 402.

The bus 414 may comprise any type of bus architecture. Examples include a memory bus, a peripheral bus, a local bus, etc. The processing unit 402 is an instruction execution machine, apparatus, or device and may comprise a microprocessor, a digital signal processor, a graphics processing unit, an application specific integrated circuit (ASIC), a field programmable gate array (FPGA), etc. The processing unit 402 may be configured to execute program instructions stored in the memory 404 and/or the storage 406 and/or received via the data entry module 408.

The memory 404 may include read only memory (ROM) 416 and random access memory (RAM) 418. The memory 404 may be configured to store program instructions and data during operation of the hardware device 400. In various embodiments, the memory 404 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 404 may also include nonvolatile memory technologies such as nonvolatile flash RAM (NVRAM) or ROM. In some embodiments, it is contemplated that the memory 404 may include a combination of technologies such as the foregoing, as well as other technologies not specifically mentioned. When the subject matter is implemented in a computer system, a basic input/output system (BIOS) 420, containing the basic routines that help to transfer information between elements within the computer system, such as during start-up, is stored in the ROM 416.

The storage 406 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 400.

It is noted that the methods described herein may be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 406, the ROM 416 or the RAM 418, including an operating system 422, one or more applications programs 424, program data 426, and other program modules 428. A user may enter commands and information into the hardware device 400 through the data entry module 408. The data entry module 408 may include mechanisms such as a keyboard, a touch screen, a pointing device, etc. Other external input devices (not shown) are connected to the hardware device 400 via an external data entry interface 430. By way of example and not limitation, external input devices may include a microphone, joystick, game pad, satellite dish, scanner, or the like. In some embodiments, external input devices may include video or audio input devices such as a video camera, a still camera, etc. The data entry module 408 may be configured to receive input from one or more users of the hardware device 400 and to deliver such input to the processing unit 402 and/or the memory 404 via the bus 414.

A display 432 is also connected to the bus 414 via the display adapter 410. The display 432 may be configured to display output of the hardware device 400 to one or more users. In some embodiments, a given device such as a touch screen, for example, may function as both the data entry module 408 and the display 432. External display devices may also be connected to the bus 414 via an external display interface 434. Other peripheral output devices, not shown, such as speakers and printers, may be connected to the hardware device 400.

The hardware device 400 may operate in a networked environment using logical connections to one or more remote nodes (not shown) via the communication interface 412. The remote node may be another computer, a server, a router, a peer device or other common network node, and typically includes many or all of the elements described above relative to the hardware device 400. The communication interface 412 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 412 may include logic configured to support direct memory access (DMA) transfers between the memory 404 and other devices.

In a networked environment, program modules depicted relative to the hardware device 400, or portions thereof, may be stored in a remote storage device, such as, for example, on a server. It will be appreciated that other hardware and/or software to establish a communications link between the hardware device 400 and other devices may be used.

It should be understood that the arrangement of the hardware device 400 illustrated in FIG. 4 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of the hardware device 400.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 4.

Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system comprising:
one or more processors; and
a non-transitory computer readable medium storing a plurality of instructions, which when executed, cause the one or more processors to:
identify a redundancy number of replicas associated with a data object, in response to receiving a request to store a replica of the data object into any cloud storage node associated with an attribute of a plurality of cloud storage nodes, the redundancy number of replicas being an arithmetical value that represents protection policy of a level of protection against failed storage nodes;
identify a number of cloud storage nodes that are associated with the attribute specified in the request;
determine whether the identified number of cloud storage nodes is greater than the redundancy number;
identify a redundancy number of cloud storage nodes as a subset of the identified number of cloud storage nodes that are associated with the attribute specified in the request, based on the data object and a unique identifier associated with each of the number of cloud storage nodes, in response to a determination that the identified number of cloud storage nodes is greater than the redundancy number; and
store the redundancy number of replicas into the corresponding redundancy number of cloud storage nodes.

2. The system of claim 1, wherein the attribute comprises a plurality of attributes.

3. The system of claim 1, wherein identifying the number of cloud storage nodes that are associated with the attribute comprises searching a distributed hash table for a hash value of the attribute.

4. The system of claim 1, wherein the plurality of instructions further causes the processor to store the redundancy number of replicas into the number of cloud storage nodes, in response to a determination that the number of cloud storage nodes is not greater than the redundancy number.

5. The system of claim 1, wherein identifying the redundancy number of cloud storage nodes comprises creating a hash value by applying a consistent hash function to the replica, and comparing the hash value against the unique identifier associated with each of the number of cloud storage nodes.

6. The system of claim 1, wherein the plurality of instructions further causes the processor to:
retrieve a replica from an available cloud storage node of the redundancy number of cloud storage nodes, in response to a determination that one cloud storage node of the redundancy number of cloud storage nodes is unavailable; and
store the replica into a cloud storage node of the number of cloud storage nodes that excludes the redundancy number of cloud storage nodes.

7. The system of claim 1, wherein the plurality of instructions further causes the processor to:
identify the number of cloud storage nodes that are associated with the attribute, in response to receiving a request to retrieve the replica of the data object from any cloud storage node associated with the attribute;
identify the redundancy number of cloud storage nodes as the subset of the number of cloud storage nodes, based on the data object and the unique identifier associated with each of the number of cloud storage nodes; and
retrieve any replica from any of the redundancy number of cloud storage nodes.

8. A method comprising:
identifying a redundancy number of replicas associated with a data object, in response to receiving a request to store a replica of the data object into any cloud storage node associated with an attribute of a plurality of cloud storage nodes, the redundancy number of replicas being an arithmetical value that represents protection policy of a level of protection against failed storage nodes;
identifying a number of cloud storage nodes that are associated with the attribute specified in the request;
determining whether the identified number of cloud storage nodes is greater than the redundancy number;
identifying a redundancy number of cloud storage nodes as a subset of the identified number of cloud storage nodes that are associated with the attribute specified in the request, based on the data object and a unique identifier associated with each of the number of cloud storage nodes, in response to a determination that the identified number of cloud storage nodes is greater than the redundancy number; and
storing the redundancy number of replicas into the corresponding redundancy number of cloud storage nodes.

9. The computer-implemented method of claim 8, wherein the attribute comprises a plurality of attributes.

10. The computer-implemented method of claim 8, wherein identifying the number of cloud storage nodes that are associated with the attribute comprises searching a distributed hash table for a hash value of the attribute.

11. The computer-implemented method of claim 8, wherein the computer-implemented method further comprises storing the redundancy number of replicas into the number of cloud storage nodes, in response to a determination that the number of cloud storage nodes is not greater than the redundancy number.

12. The computer-implemented method of claim 8, wherein identifying the redundancy number of cloud storage nodes comprises creating a hash value by applying a consistent hash function to the replica, and comparing the hash value against the unique identifier associated with each of the number of cloud storage nodes.

13. The computer-implemented method of claim 8, wherein the computer-implemented method further comprises:
retrieving a replica from an available cloud storage node of the redundancy number of cloud storage nodes, in response to a determination that one cloud storage node of the redundancy number of cloud storage nodes is unavailable; and
storing the replica into a cloud storage node of the number of cloud storage nodes that excludes the redundancy number of cloud storage nodes.

14. The computer-implemented method of claim 8, wherein the computer-implemented method further comprises:

identifying the number of cloud storage nodes that are associated with the attribute, in response to receiving a request to retrieve the replica of the data object from any cloud storage node associated with the attribute;

identifying the redundancy number of cloud storage nodes as the subset of the number of cloud storage nodes, based on the data object and the unique identifier associated with each of the number of cloud storage nodes; and retrieving any replica from any of the redundancy number of cloud storage nodes.

15. A computer program product, comprising a non-transitory computer-readable medium having a computer-readable program code embodied therein to be executed by one or more processors, the program code including instructions to:

identify a redundancy number of replicas associated with a data object, in response to receiving a request to store a replica of the data object into any cloud storage node associated with an attribute of a plurality of cloud storage nodes, the redundancy number of replicas being an arithmetical value that represents protection policy of a level of protection against failed storage nodes;

identify a number of cloud storage nodes that are associated with the attribute specified in the request;

determine whether the identified number of cloud storage nodes is greater than the redundancy number;

identify a redundancy number of cloud storage nodes as a subset of the identified number of cloud storage nodes that are associated with the attribute specified in the request, based on the data object and a unique identifier associated with each of the number of cloud storage nodes, in response to a determination that the identified number of cloud storage nodes is greater than the redundancy number; and store the redundancy number of replicas into the corresponding redundancy number of cloud storage nodes.

16. The computer program product of claim 15, wherein the attribute comprises a plurality of attributes, and identifying the number of cloud storage nodes that are associated with the attribute comprises searching a distributed hash table for a hash value of the attribute.

17. The computer program product of claim 15, wherein the program code includes further instructions to store the redundancy number of replicas into the number of cloud storage nodes, in response to a determination that the number of cloud storage nodes is not greater than the redundancy number.

18. The computer program product of claim 15, wherein identifying the redundancy number of cloud storage nodes comprises creating a hash value by applying a consistent hash function to the replica, and comparing the hash value against the unique identifier associated with each of the number of cloud storage nodes.

19. The computer program product of claim 15, wherein the program code includes further instructions to:

retrieve a replica from an available cloud storage node of the redundancy number of cloud storage nodes, in response to a determination that one cloud storage node of the redundancy number of cloud storage nodes is unavailable; and store the replica into a cloud storage node of the number of cloud storage nodes that excludes the redundancy number of cloud storage nodes.

20. The computer program product of claim 15, the program code includes further instructions to:

identify the number of cloud storage nodes that are associated with the attribute, in response to receiving a request to retrieve the replica of the data object from any cloud storage node associated with the attribute;

identify the redundancy number of cloud storage nodes as the subset of the number of cloud storage nodes, based on the data object and the unique identifier associated with each of the number of cloud storage nodes; and retrieve any replica from any of the redundancy number of cloud storage nodes.

\* \* \* \* \*